US008554705B1

(12) United States Patent
Sitnikau (10) Patent No.: US 8,554,705 B1
(45) Date of Patent: Oct. 8, 2013

(54) COMPUTER BASED EDUCATION FOR USE WITH MULTIUSER SOFTWARE

(71) Applicant: Wargaming.net, LLP, London (GB)

(72) Inventor: Anton Sitnikau, Minsk (BY)

(73) Assignee: Wargaming.net LLP, London (GB)

( * ) Notice: Subject to any disclaimer, the term of this patent is extended or adjusted under 35 U.S.C. 154(b) by 5 days.

(21) Appl. No.: 13/662,637

(22) Filed: Oct. 29, 2012

(51) Int. Cl.
*G06F 15/18* (2006.01)

(52) U.S. Cl.
USPC ............................................................ 706/14

(58) Field of Classification Search
None
See application file for complete search history.

(56) References Cited

U.S. PATENT DOCUMENTS

| | | | |
|---|---|---|---|
| 6,106,395 A | 8/2000 | Begis | |
| 6,648,760 B1 | 11/2003 | Nicastro | |
| 7,296,007 B1 | 11/2007 | Funge et al. | |
| 7,636,697 B1 | 12/2009 | Dobson et al. | |
| 7,677,967 B2 | 3/2010 | Jessop et al. | |
| 7,854,653 B2 | 12/2010 | Kane | |
| 7,887,416 B2 | 2/2011 | Katsume et al. | |
| 2003/0118971 A1* | 6/2003 | Rogachev | 434/11 |
| 2005/0089825 A1 | 4/2005 | Zulferino | |
| 2005/0182693 A1* | 8/2005 | Alivandi | 705/27 |
| 2006/0142903 A1* | 6/2006 | Padan | 701/3 |
| 2007/0082729 A1 | 4/2007 | Letovsky | |
| 2007/0207846 A1* | 9/2007 | Burak et al. | 463/9 |
| 2008/0039167 A1 | 2/2008 | Harris et al. | |
| 2010/0144424 A1 | 6/2010 | Rogers et al. | |
| 2010/0233667 A1 | 9/2010 | Wilson et al. | |
| 2010/0279762 A1* | 11/2010 | Sohn et al. | 463/23 |
| 2010/0304839 A1 | 12/2010 | Johnson | |
| 2011/0086686 A1 | 4/2011 | Avent et al. | |

FOREIGN PATENT DOCUMENTS

WO 2011120038 A1 9/2011

OTHER PUBLICATIONS

Remolina et al. "Intelligent Simulation-based Tutors for Flight Training" Interservice/Industri Training, Simulation and Education Conference (I/ITSEC) 2004.*
Jones et al., "Automated Intelligent Pilots for Combat Flight Simulation" in Al Magazine vol. 20 No. 1 (1999).*
Gu et al., "Active Botnet Probing to Identify Obscure Command and COntrol Channels" on the Proceedings of the 2009 Annual COmputer Security Applications Conference.*
Nick Haywood, "Enemy Territory: Quake Wars—now with bots!", Hexus.net, Aug. 23, 2007.

(Continued)

*Primary Examiner* — Kakali Chaki
*Assistant Examiner* — Mario Riojas Ramirez
(74) *Attorney, Agent, or Firm* — Banner & Witcoff, Ltd.

(57) ABSTRACT

Methods and systems for performing computer based education are described herein. According to various aspects, a user is presented with computer-based education regarding completion of an objective within an interactive computing environment. When the user is ready to perform (or attempt to perform) the objective in a real-world or "live" situation, the software may place the user in a training session where other users are actually computer-controlled participants, or bots, having a prescribed level of artificial intelligence. If the user successfully completes the objective, the software may increment the level of AI until the user completes the objective while interacting with bots having a required level of AI. The user may thereafter be allowed to participate in dynamic sessions with other human users. During training sessions the user may be affirmatively led to believe that other participants are human, rather than bots.

19 Claims, 9 Drawing Sheets

(56) References Cited

OTHER PUBLICATIONS

Chandler & Noriega, "Leveling the Playing Field—Games Handicapping" Proceedings of the 6th WSEAS International Conference on Multimedia, Internet & Video Technologies, Lisbon, Portugal, Sep. 22-24, 2006.

Soni & Hingston, "Bots Trained to Play Like a Human are More Fun", Edith Cowan University, Research Online, 2008.

Horup, et al, "Humies—AI in games", Aalborg University, P2 Project, May 29, 2007.

Perla & Markowitz, "Conversations with Wargamers", Centers for Naval Analyses Alexandria, VA, Jan. 2009.

Gallego et al, "Playful security: A computer game for secure wireless device paring", 2011 16th International Conference on Computer Games (CGAMES), Jul. 27-30, 2011, pp. 177-184.

Hy et al, "Teaching bayesian behaviours to video game characters", Robotics and Autonomous Systems, vol. 47, Issues 2 & 3, Jun. 30, 2004, pp. 177-185.

Zea et al, "Collaborative learning by means of video games: an entertainment system in the learning processes", Ninth IEEE International Conference on Advanced Learning Technologies, 2009, ICALT Jul. 15-17, 2009.

Rapeepisarn et al, "Similarities and differences between learn through play and edutainment", IE '06 Proceedings of the 3rd Australasian conference on Interactive entertainment, pp. 28-32.

Begg et al, "Game-informed learning: Applying computer game processes to higher education".

Cody Hargreaves "Eve Online Beginners Guide—Part 3 (Choosing a Focus)" MMO Games, Fri Apr. 20, 2012.

Medjai "MMO-Champion—Forum—Video Games—Video Games Discussion—I suck at FPS games . . . any advise?" MMO Champion, Oct. 3, 2011.

\* cited by examiner

COMPUTER BASED EDUCATION FOR USE WITH MULTIUSER SOFTWARE

FIELD

The invention relates generally to educational computer software, and computer-based education. More specifically, the invention provides methods and systems for teaching users to perform a particular task using computer software that simulates a particular environment in which the task is to be performed, and by simulating persons with whom a user may interact while performing the task.

BACKGROUND

Computer-based education and educational software have developed significantly over the past 30 years. However, educational software and computer-based educational techniques lack the ability for a user to test his or her learned knowledge in the "real world", while still being in a controlled environment. In addition, if a user is "released to the world" without having accomplished a prescribed level of accomplishment on computer-based educational software, the user will be unprepared for real-life scenarios and the software may be considered a failure as an educational tool.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. To overcome limitations in the prior art described above, and to overcome other limitations that will be apparent upon reading and understanding the present specification, aspects described herein are directed to methods and systems for computer-based education and learning that may be useful with multiuser and/or interactive software.

A first illustrative aspect provides a method for providing instructions, via an instructional computing device, to a user regarding how to complete an objective. The method may include executing, on the instructional computing device, a training session, where the training session provides the user an interactive computing environment through which the user attempts to achieve or complete the objective, and during the training session the user is interacting only with one or more other automated participants, where each automated participant is controlled by a bot having a predetermining level of artificial intelligence. The method may further include determining whether the user has achieved the objective, and adjusting the predetermined level of artificial intelligence of the one or more automated participants to a higher predetermined level of artificial intelligence when the user has achieved the objective. The method may include repeating the executing, determining, and adjusting steps until the user has achieved the objective with the one or more automated participants having a predefined threshold level of artificial intelligence. Only after determining that the user has achieved the objective with the one or more automated participants having the predefined threshold level of artificial intelligence, the user may be permitted to enter an interactive session, where the interactive session includes one or more other human participants.

Some aspects may include, during each training session, providing to the user one or more stimuli (e.g., chat messages, typographical errors, usernames, and/or instructions, etc.) indicating that each automated participant is a human participant.

In some aspects, each participant controls an airplane, and the objective comprises destroying participants, other airplanes, and/or ground targets associated with an enemy team.

In some aspects, each incremented level of artificial intelligence simulate human participants having increasing levels of experience completing the objective. AI levels may be adjusted numerous times before the user is permitted to enter a dynamic session. In one aspect, permitting the user to enter the interactive session includes, prior to completion of the objective with the one or more automated participants having the predefined threshold level of artificial intelligence, setting a flag usable to prevent the user from entering the interactive session, and upon completion of the objective with the one or more automated participants having the predefined threshold level of artificial intelligence, setting the flag to allow the user to enter the interactive session.

Other aspects provide systems and computer readable media that store computer executable instructions that, when executed, perform one or more aspects described herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments may be practiced. It is to be understood that other embodiments may be utilized and structural and functional modifications may be made without departing from the scope described herein. Aspects of the invention are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As a general introduction, aspects described herein relate to methods and systems for providing computer-based education and educational software. According to various aspects, a user may be presented with computer-based education regarding completion of an objective within an interactive computing environment (e.g., a video game, interactive software, etc). After initial instruction, when the user is ready to perform (or attempt to perform) the objective in a real-world or "live" situation, the software may place the user in a training session where other users are actually computer-controlled participants, or bots, having a prescribed level of artificial intelligence (AI). If the user successfully completes the objective, the software may increment the level of AI until the user completes the objective while interacting with bots having a required level of AI. The user may thereafter be allowed to participate in dynamic sessions with other human users. During training sessions the user may be affirmatively led to believe that other participants are human, rather than automated bots. As used herein, artificial intelligence refers to any means or mechanism that may be used to control a bot or other element within a computing environment. AI may include fuzzy logic engines, decision-making engines, preset targeting accuracy levels, and/or programmatically intelligent software.

Figure 1:
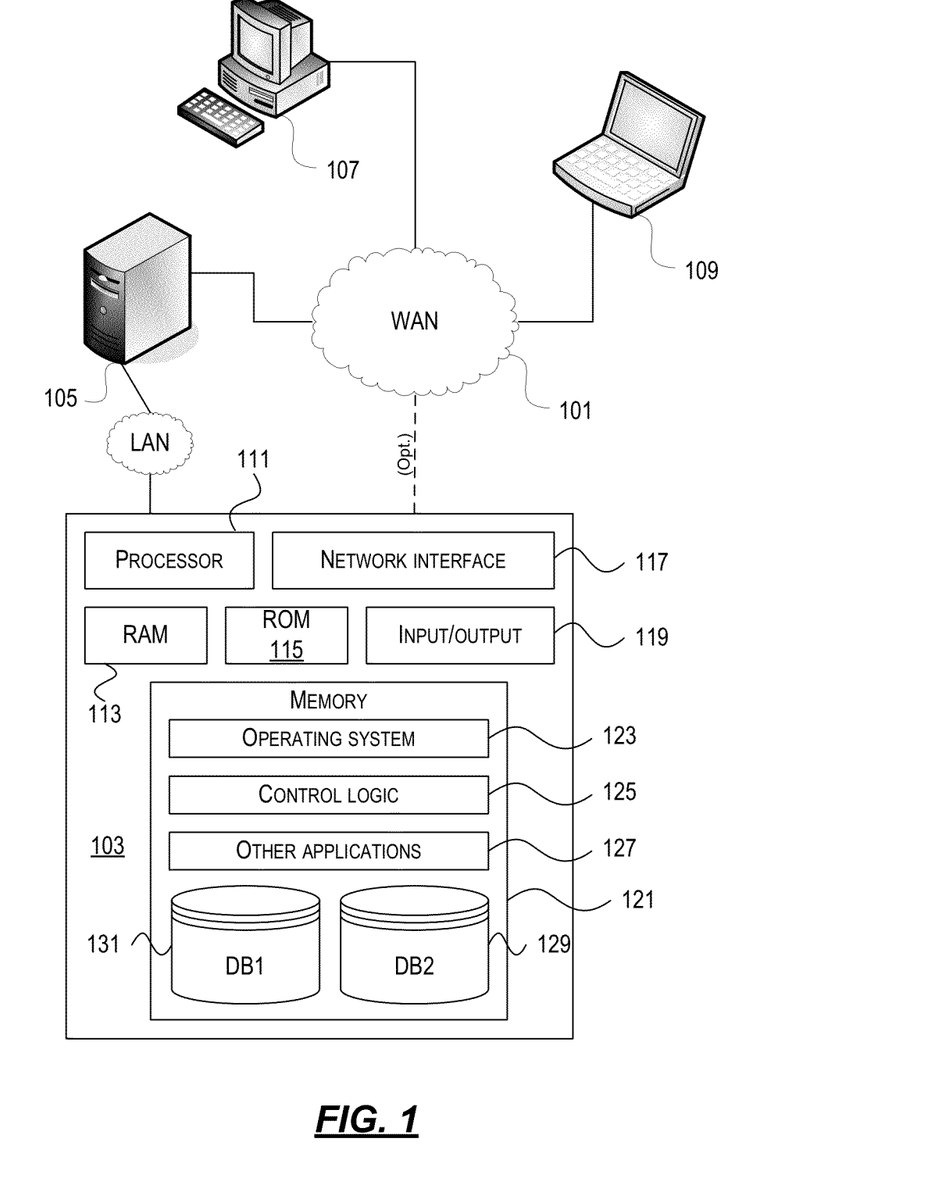
FIG. 1 illustrates a system architecture that may be used to perform one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet, token ring, etc. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the invention as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network (e.g., a LAN). Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet). Data servers and web servers may be arranged in different architectures to meet the needs of the service provider. For example, web server may only be used for login authentication, and then all communication may be directly between a client and a data server.

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server, or split among multiple servers.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the invention, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), account management services, etc.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
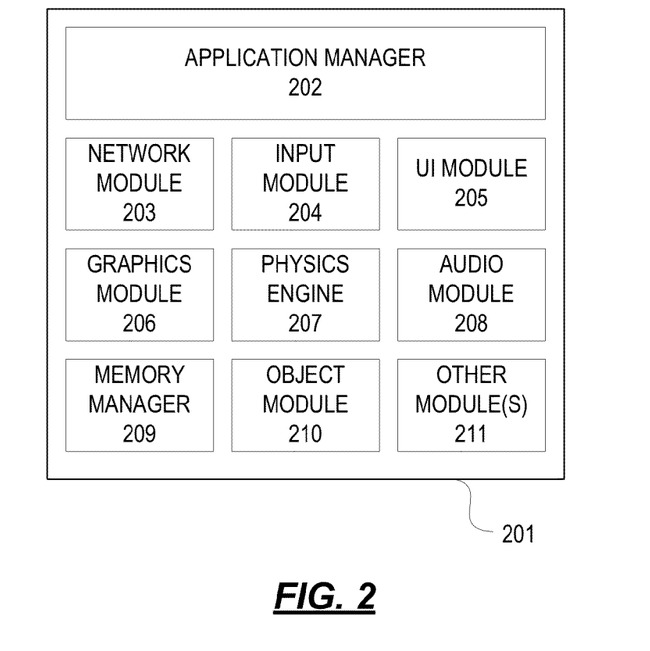
FIG. 2 illustrates a software architecture that may be used according to one more illustrative aspects.

FIG. 2 illustrates a block diagram of a software application 201, e.g., which may be stored in control logic 125 (FIG. 1) as stored on server 103 and/or one or more of client devices 107, 109. Each block in FIG. 2 illustrates a logical software module or function that performs an action, provides a capability or feature, implements an object, or performs some other aspect of the software application. For illustrative purposes only, software application may be further described herein as a video game or video game software application. However, the software application may be other than a video game, and may be any type of software application whereby a user is taught to complete an objective. When the video game software 201 executes on a data processing system such as a PC or game console, the modules operate collectively to provide a video game experience to a player. The modules illustrated in FIG. 2 are illustrative only, and additional or different modules may be used. The same, additional or different modules may be executed in tandem on a server with which each client device is connected.

Video game software 201 may include, e.g., an application manager module 202, which manages the overall operation of the video game and may be the initial module launched when the video game is executed. Video game software 201 may also include a network module 203, which manages network games sessions. A network game session may include e.g., player versus player sessions, a co-operative campaign with other networked players, or other compartmentalized periods of game play involving players located at discrete network locations, as further discussed herein. A memory manager module 209 performs memory management during execution of the video game 201. An input module 204 may receive and interpret user input via a game controller, keyboard, mouse, and the like, and provide the interpreted commands to game manager 202, network module 203, or other applicable module. UI module 205 may manage and control the user interface, including the display displayed on the video output device, interpreting input via the input module 204, and providing audio output via audio module 208.

Various software modules may operate with one or more classes or objects defined and used in the video game 201. The classes and objects may be defined with reference to an object module 210, and may include portions of executable software code and/or one or more data structures, depending on the object. Each object may be rendered and simulated in the virtual world in accordance with a physics engine 207. Video game software 201 may include other software modules 211 as needed. FIG. 2 illustrates one possible software architecture. Others may be used. Each module depicted in FIG. 2 may communicate directly or indirectly with each other module, e.g., by passing objects, data, parameters, input, and output, etc., to accomplish the software application's desired functionality.

Figure 3:
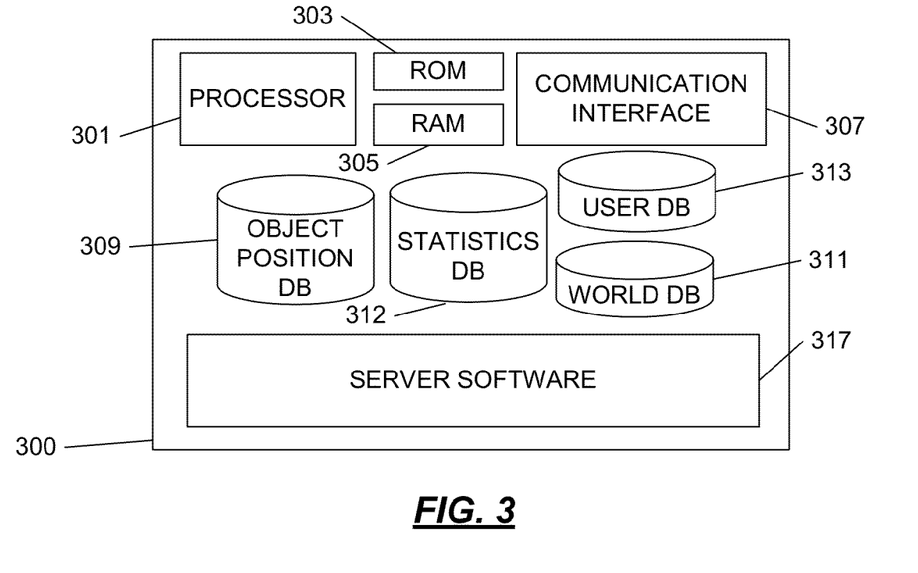
FIG. 3 illustrates a server architecture that may be used according to one or more illustrative aspects.

Referring now to FIG. 3, a virtual world server 300 (e.g., server 103) may be configured to generate and operate a massive multiplayer online game, such as virtual world or the like. Server 300 may include processor 301, ROM 303, RAM 305, communication interface 307, object position database 309, world database 311, user database 313, and server software 317. Object position database 309 may be configured to store position information for each object (e.g., based on commands to move a vehicle received from each client).

A world database 311 may store rules, algorithms and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-object items and components. User database 313, on the other hand, may be configured to store information describing a user controlling an object. For example, user database 313 may include account information, user preferences, one or more classes of user experience points and/or levels, payment information, user identification information, character definitions, state tables, and the like. Each of databases 309, 311, 313 may or may not be a conventional database, and instead may refer to data stored in a memory, accessed as needed by the server software.

Features described herein may be used with or in a variety of video games and other instructional software applications, including but not limited to, WORLD OF TANKS, WORLD OF WARSHIPS, and WORLD OF WARPLANES by Wargaming.net LLP of London, UK. Aspects described herein may also be used with other software applications, e.g., educational software, business software, enterprise software, etc., and are not limited to any one genre or implementation.

According to some aspects, e.g., as used within WORLD OF WARPLANES, a user may be in control of a simulated aircraft and tasked with performing one or more objectives as part of a game session. Example game objectives may include engagement in combat with a member or members of an opposing team, targeting and firing upon an opposing team's base, territory, and/or land-based targets, or performing a predefined sequence of aircraft maneuvers. A current example of an aircraft (also referred to herein as a vehicle) may be a fixed-wing aircraft (although rotating wing, vertical thrust, and/or other types of aircraft may also be simulated). Various aspects of the disclosure provide features and capabilities that enhance user training to allow a user to more rapidly learn how to control and maneuver vehicles, destroy opponents, and attack ground targets within the virtual world and may enable the user to better focus on completion of game objectives.

Figure 4:
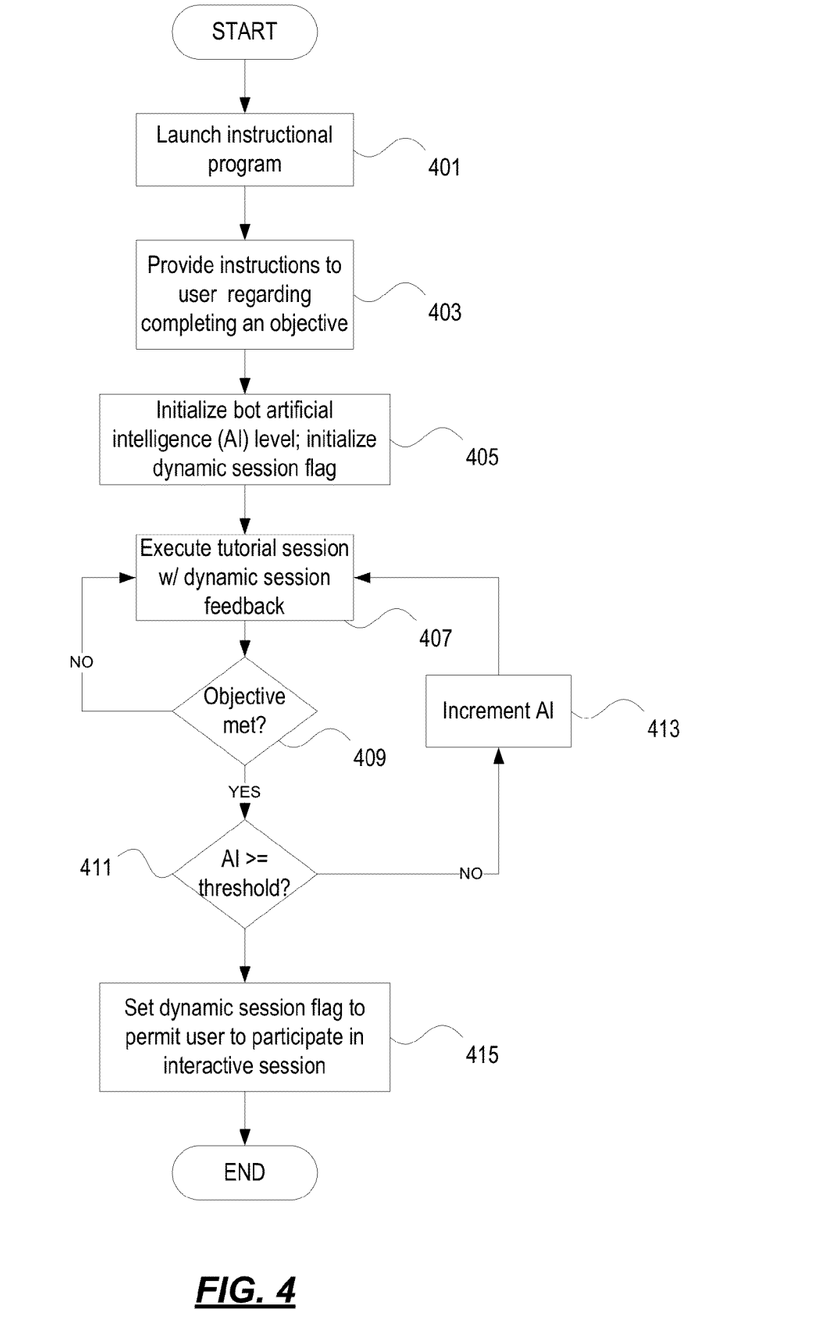
FIG. 4 illustrates a method for instructing a user of an instructional software program using an interactive computing environment that may be used according to one or more illustrative aspects.

With reference to FIG. 4, various aspects of the disclosure provide features and capabilities that enhance training of users to achieve an objective by providing users a real-world experience while training is still under control of an increasingly difficult artificial intelligence engine.

Initially, in step 401, a computer launches an instructional program, e.g., responsive to user input to launch the program. The instructional program, as discussed above, may be any type of software that teaches a user to perform an action, e.g., business software (word processors, spreadsheets, databases, presentation software, etc.), enterprise software (e.g., to manage a business's operations), interactive software (e.g., remote access software, communications software, etc.), entertainment software (e.g., media players, video games, etc.). For illustrative purposes only, in this example the instructional program is a video game, such as WORLD OF WARPLANES.

In step 403, the instructional program, under control of a computing device on which it is executing, provides instructions to the user regarding how to complete an objective. The objective may be any task the user may be required to accomplish. For example, if the instructional program is a spreadsheet program, then the objective may be to create a table or spreadsheet have certain properties or functionality. If the instructional program is a video game, the objective may be a task the user needs to perform in order to win or advance in the video game. In an air combat game, the objective may include engagement in air combat against a member or members of an opposing team, targeting and firing upon an opposing team's base, territory, and/or land-based targets, and/or performing a predefined sequence of aerial maneuvers. The objective may further require that the user completes the objective before an opposing team completes a similar objective, or before a predetermined period of time expires. The instructions may further include an opportunity for the user to perform the objective or a task required to complete the objective, under the direction of the instructional program, without obstacles or enemies present.

Upon completion of step 403, the user may provide input indicating that the user understands how to complete the objective, and further may provide input indicating a desire to compete in a session against other human participants within the instructional program (in this example, a video game). As used herein, a session refers to an instance of a program in which a user, through interaction with an interactive computing environment, attempts to complete an objective, either alone or in combination or against other participants. A dynamic session refers to a session in which only human participants participate. A dynamic session may also be referred to as player-versus-player, or PvP. A training session refers to a session in which the user is the only human participant, but in which the user is explicitly led to believe there are other human participants, and in which the objective(s) is/are similar to the game objective(s) in a dynamic session. A training session may also be referred to as player-versus-environment, or PvE (optionally avoiding use of the word "training" if desired). A hybrid session refers to a session in which at least two human participants participate, and one or more automated participants participate. An automated participant (aka, bot) refers to a participant that, while appearing to be a human participant, is in fact controlled by an artificial intelligence engine. The artificial intelligence engine provides the actual input into the game for the bot to behave as a human participant with a predefined level of experience playing the game. The level of experience may vary, and may be incremented over time as further described herein. Also described herein are tutorial sessions, discussed below, which include one or more objectives that are different from the objectives in training and dynamic sessions.

Upon receiving user input to enter a dynamic session, in step 405 the controlling server (e.g., server 300) may initialize the predetermined level of artificial intelligence to a predetermined minimum level, and may further set a session flag (e.g., session=false) indicating whether or not the user is permitted to enter a dynamic (or hybrid) session.

In step 407, despite the user's request to enter a dynamic session, server 300 may initiate a training session for the user, while providing feedback to the user indicating that the session is a dynamic session. Feedback may include providing output to the user explicitly indicating the session is a dynamic session (i.e., has other human participants), presenting one or more user names to the user that lead the user to believe the other users are human (e.g., by giving a bot an actual username of another human participant), and/or inserting one or more typographical errors into chat messages of automated participants, where the typographical errors are based on one or more typographical errors commonly made by human participants. During the training session the user attempts to complete the specified objective while participating with the one or more other participants (here, bots having the lowest predetermined level of artificial intelligence). The training session may end either upon the expiration of a predetermined amount of time, or upon the occurrence of one or more specific events (e.g., completion of the objective or it becomes impossible to complete the objective).

When the training session is over, in step 409, the instructional program determines whether the user completed the objective. If the user did not complete the objective, then the next time the user requests to enter a session, the server may return to step 407 an initiate another training session where the automated participants have the same level of artificial intelligence (AI) as they did before.

If in step 409 it is determined that the user did complete the objective, then in step 411 the server 300 determines whether the AI of automated participants has already been incremented to a predetermined maximum level. If the AI has not already been incremented to the predetermined maximum level, then in step 413 the server increments the AI level, and waits for the user to request another session, at which time the server returns to step 409 to initiate a training session with the AI at the incremented AI level.

If in step 411 is it determined that the AI has already been incremented to the predetermined maximum level, then in step 415 the server adjusts the session flag (e.g., session=true) to permit the user into actual dynamic (or hybrid) sessions. Subsequently, when the user requests to enter a session, the server may place the user in a dynamic (or hybrid) session, instead of a training session.

The above-described method may be altered or changed, depending on the type of instructional program and the computing environment in which it is executed. For example, a client-server architecture may be used, or the entire instructional program may execute on a single device, operate peer-to-peer, or use some other architecture. In addition, the number of predetermined levels of AI that the bots progress through may vary. For example, in one illustrative aspect, there may be 3 levels of AI. In another illustrative aspect, 4 or 5 levels of AI may be used. Still other numbers of AI levels may be used, depending on the type of instructional program. In yet other variations, an AI engine might not be used, or there may only be a single level of automated intelligence used to control the bots. Other variations may also be made, e.g., combining steps, splitting steps into multiple sub-steps, reordering steps, etc., without altering the underlying functionality of requiring the user to complete one or more training sessions before permitting the user to enter a dynamic session.

While the above aspects contemplate that a user is not aware that opponents are bots, and further that active steps are taken to lead the user to believe that opponents are human when in fact they are bots, another illustrative embodiment might explicitly inform the user that a training session is taking place, and that bot planes are being used instead of human opponents. Further, AI levels might not be used. Rather, one or more tutorials may be associated with a preset difficulty level. In addition, one tutorial level might need to be completed before a next, more difficult, tutorial level is unlocked for the user.

Figure 5:
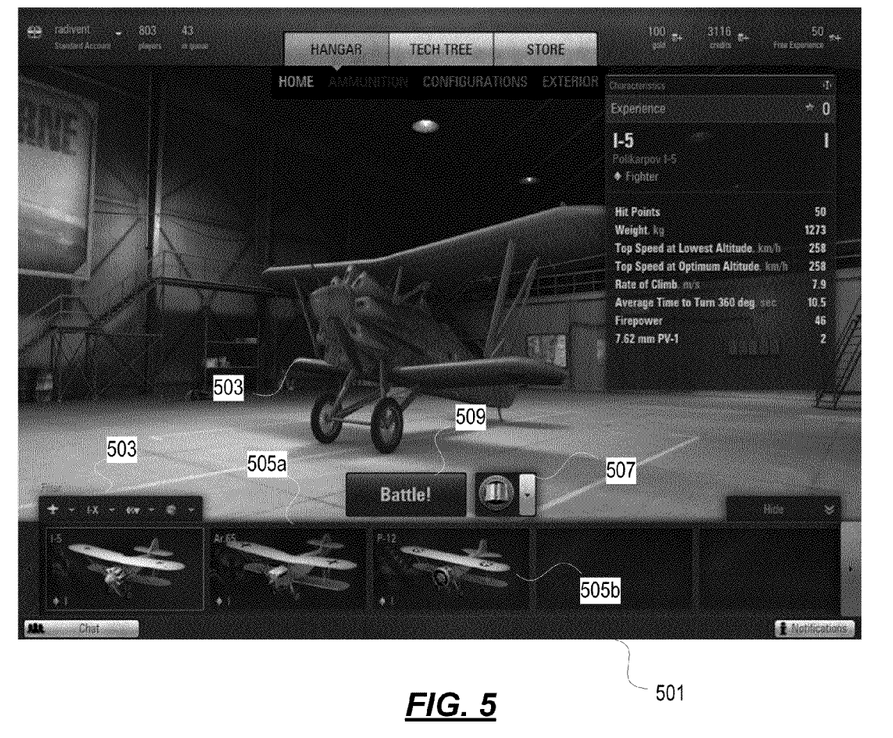
FIGS. 5-10 illustrate screenshots of user interfaces according to illustrative aspects described herein.
Figure 6:
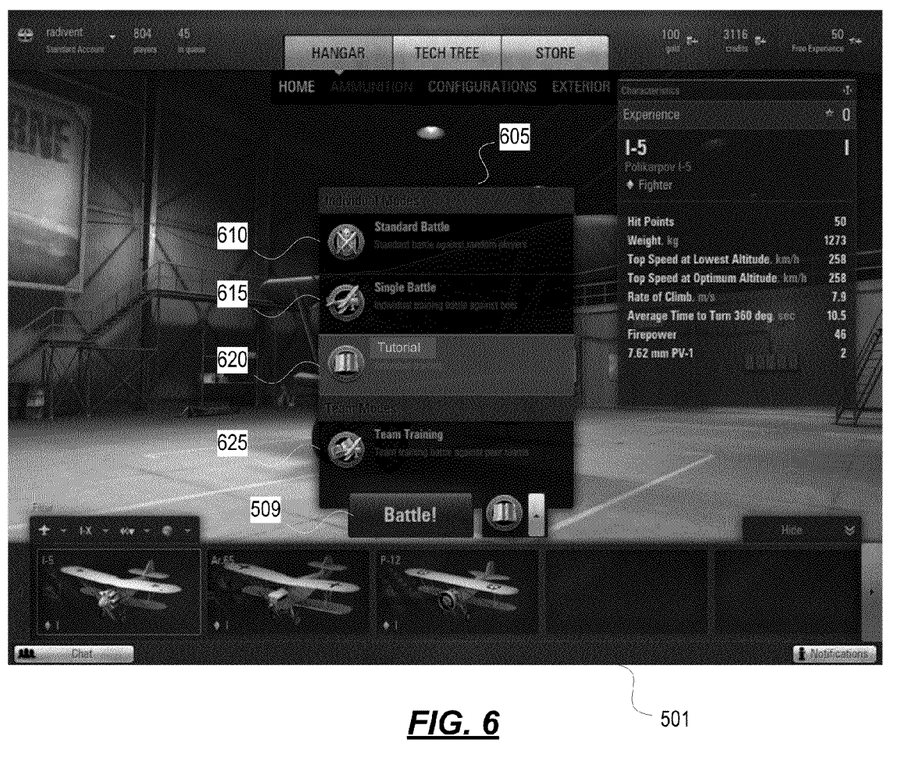

FIG. 5 illustrates a hangar screen for an illustrative embodiment where players each control an aircraft. Hangar screen 501 may include a currently selected aircraft 503, unselected aircraft 505*a*, 505*b*, session selector 507, and session start button 509. FIG. 6 illustrates hangar screen 501 after a user selects session selector 507, thereby displaying session menu 605. Session menu may include multiple options 610-625, e.g., dynamic session 610, training session 615, tutorial session 620, and team training session 625. Other session choices may alternatively be used. As distinguished from the above referenced training sessions, which provide a user practice in a simulated "real" battle session, a tutorial session is a session in which the goal is to teach the user a particular aspect of gameplay, e.g., steering in a particular direction, learning the controls of the in-game vehicle(s), dropping bombs on a target, attacking other airplanes, etc., but in a controlled environment.

Figure 7:
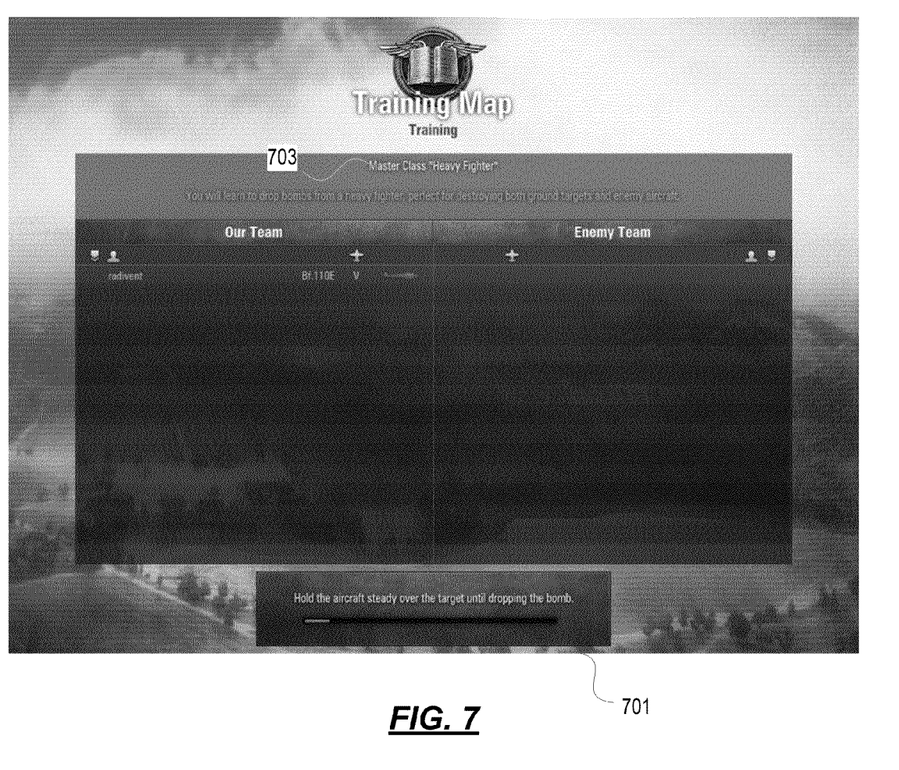
Figure 8:
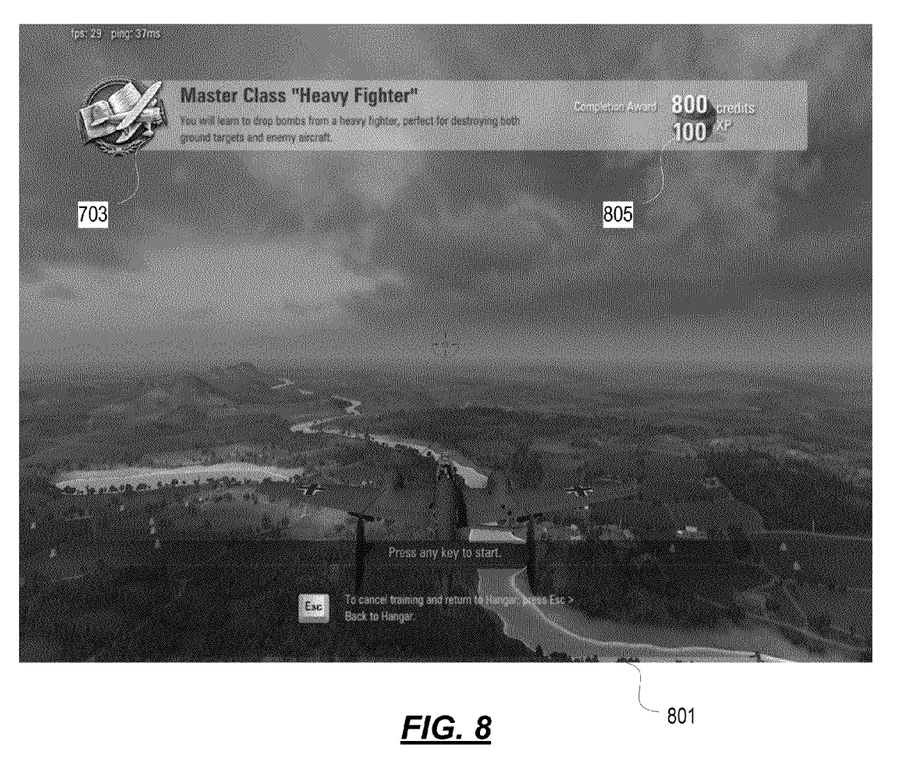
Figure 9:
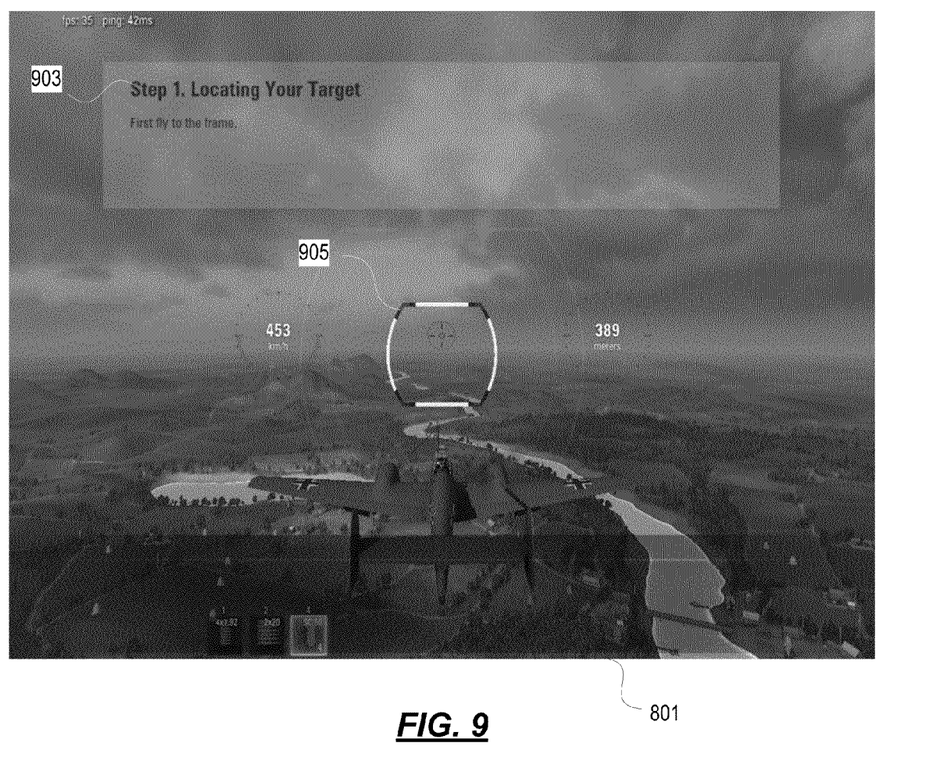

If the user selects tutorial mode 620, then selects session start button 509, the user is presented a map loading screen 701, which indicates the name of the tutorial 703. When the tutorial starts, the user is presented the tutorial screen 801, which provides the user interface for the interactive game environment. Tutorial screen 801 may include a tutorial name 703, as well as a reward 805, which the user will receive upon successful completion. The reward is an incentive to encourage users to complete tutorials. Once the tutorial is started, the user may see a tutorial instruction 903, and a tutorial objective 905. Each tutorial may include multiple instructions and objectives. Once a user completes a particular tutorial, the user may be allowed to progress to a next tutorial and earn another corresponding reward.

According to one aspect, only after a user completes the tutorial sessions is the user permitted to initiate training sessions, and only after the user completes the training sessions is the user permitted to initiate dynamic sessions. According to another aspect, the user can select from tutorial sessions, training sessions, and dynamic sessions at any time using selector 507 and menu 605. In yet another aspect, as described above, if the user is not permitted to select dynamic session 610 (e.g., because the user has not completed the training and/or tutorial sessions), but does in fact select dynamic session 610, the system may instead initiate a tutorial session or training session, based on the user's current permissions.

Figure 10:
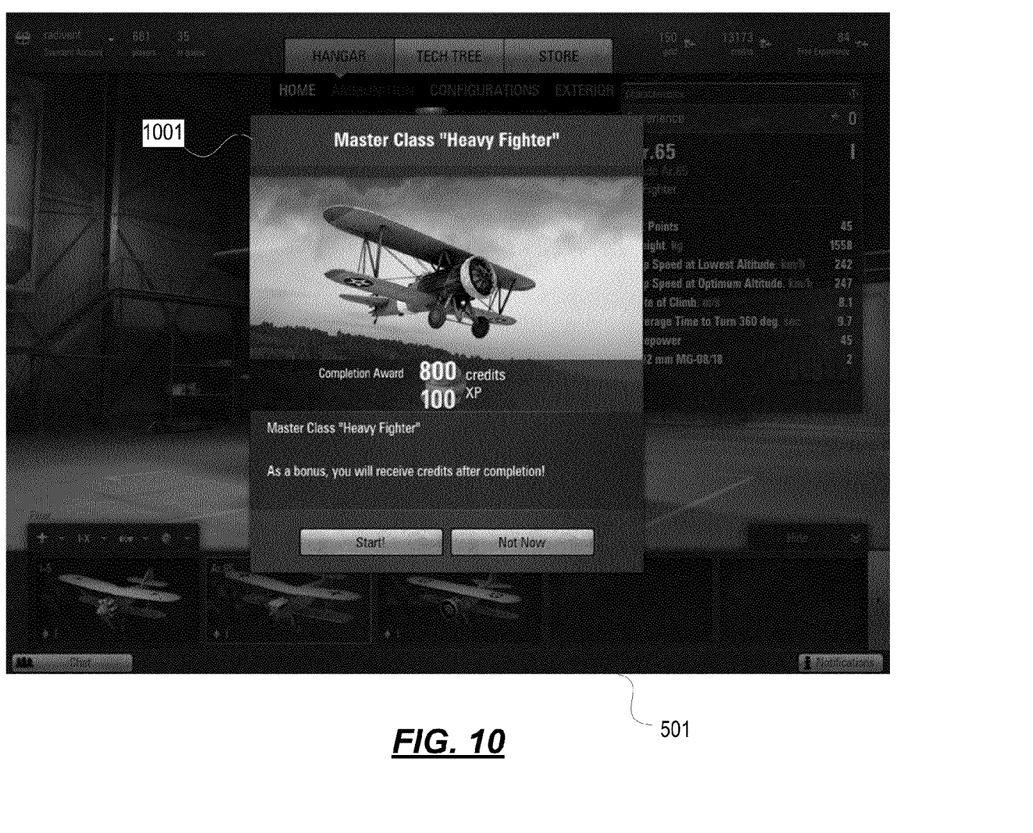

As shown in FIG. 10, according to an aspect where the user can select dynamic session 610, training session 615, tutorial session 620, or team session 625 at any time, the system may present a training reminder 1001 to the user at various times to encourage the user to complete training and/or tutorial sessions. Thus, even where a player chooses to skip training sessions, the system may provide a notification window, e.g., warning that the player might not be skilled enough to be successful in a dynamic session, and suggest that the user go back and complete the tutorial and/or training sessions in order to advance their skills. This will allow the user to be more successful in the dynamic sessions. According to one alternative aspect, when a player skips one or more tutorial and/or training sessions, the system may persistently display a notification, warning, and/or reminder about easier gameplay being available in tutorial and/or training sessions. Alternatively, such as notification may pop up at predetermined intervals or locations on the user interface. The user is thus reminded to go back and complete the tutorials and/or training sessions.

Using aspects described above, the game system may present the user an option to participate in training sessions (although the system might not use the word "training") where the user can gain experience and confidence in game play. In training sessions, a user might typically win 75-90% of battles, whereas in dynamic sessions user win rates are typically lower than 50%. Due to easier gameplay during training sessions, the player is educated subconsciously without paying attention to training because the user is participating in a battle session that has the same objectives as in a dynamic session.

In addition, the system may allow a user to go back and initiate a training session at any time, even after the training sessions have been completed, and even after the user has won many dynamic sessions. The user can thus train his or her skills or attempt to get better results in the training session after gaining more experience.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
receiving, at a server, a request from each of a plurality of human users to participate in multi-user interactive graphical simulation;
determining that a first user of the plurality of human users has not yet completed a training requirement to participate in an interactive session of the graphical simulation, wherein each interactive session includes one or more other human users from the plurality of human users;
responsive to the determining:
providing instructions, to the first user regarding how to complete an objective within the graphical simulation, and
executing, a training session through a user interface associated with the first user, said training session providing the first user an interactive graphical computing environment through which the first user attempts to achieve the objective, wherein during said training session the first user is interacting only with a plurality of automated participants, each automated participant controlled by a bot having a predetermining level of artificial intelligence, and wherein during said training session the first user is prevented from interacting with any other human participants;
determining whether the first user has achieved the objective;
adjusting the predetermined level of artificial intelligence of the plurality of automated participants to a higher predetermined level of artificial intelligence when the first user has achieved the objective; and
repeating the executing, determining whether the first user has achieved the objective, and adjusting steps until the first user has achieved the objective with the plurality of automated participants having a predefined threshold level of artificial intelligence; and
only after determining that the first user has achieved the objective in the training session with the one or more automated participants having the predefined threshold level of artificial intelligence, permitting the first user to enter an interactive session, that includes one or more other human participants.

2. The method of claim 1, further comprising, during each training session, providing to the first user one or more stimuli indicating that each automated participant is a human participant.

3. The method of claim 2, wherein one of the stimuli comprises a chat message containing a typographical error.

4. The method of claim 2, wherein one of the stimuli comprises a username of a human participant not participating in the training session.

5. The method of claim 1, wherein each participant controls an airplane, and the objective comprises destroying a plurality of participants on an enemy team.

6. The method of claim 1, wherein each participant controls an airplane, and the objective comprises destroying a plurality of ground targets associated with an enemy team.

7. The method of claim 1, wherein each incremented level of artificial intelligence simulate human participants having increasing levels of experience completing the objective.

8. The method of claim 1, wherein the adjusting step is performed at least twice before the predefined threshold level of artificial intelligence is reached.

9. The method of claim 1, wherein permitting the first user to enter the interactive session comprises:
   prior to completion of the objective with the one or more automated participants having the predefined threshold level of artificial intelligence, setting a flag usable to prevent the first user from entering the interactive session; and
   upon completion of the objective with the one or more automated participants having the predefined threshold level of artificial intelligence, setting the flag to allow the first user to enter the interactive session.

10. One or more non-transitory computer readable storage media storing instructions that, when executed by a processor, cause a system to perform:
   initiating an instructional program for a first human user at a client device, said instructional program having a plurality of client devices logged in to a common server, each client device associated with a different human user;
   receiving a request from the first human user to participate in an interactive session of the instructional program, wherein each interactive session includes one or more other human users from the plurality of human users;
   determining that the first human user has not yet completed a training requirement to participate in an interactive session;
   responsive to the determining:
      launching a training session instead of an interactive session, said training session providing the user an interactive computing environment through which the user attempts to achieve an objective, wherein during said training session the user is interacting only with a plurality of automated participants, wherein each automated participant is controlled by a bot, and wherein each of the plurality of bots is initiated with a predetermined level of artificial intelligence, and wherein during said training session the first user is prevented from interacting with any other human participants;
      determining whether the user has completed the objective while the plurality of automated participants have at least a predefined level of artificial intelligence;
      incrementing the predetermined level of artificial intelligence when the user has completed the objective and the plurality of automated participants do not have at least the predefined level of artificial intelligence;
      repeating the launching, determining, and incrementing steps until the user has completed the objective while the plurality of automated participants have at least the predefined level of artificial intelligence; and
      only after determining that the user has achieved the objective in the training session with the plurality of automated participants having the predefined threshold level of artificial intelligence, permitting the user to launch an interactive session, that includes one or more human participants.

11. The computer readable storage media of claim 10, said instructions further causing the system to perform, during each training session, providing to the first human user one or more stimuli indicating that each automated participant is a human participant.

12. The computer readable storage media of claim 11, wherein one of the stimuli comprises a chat message containing a typographical error.

13. The computer readable storage media of claim 11, wherein one of the stimuli comprises a username of a human participant not participating in the training session.

14. The computer readable storage media of claim 10, wherein each participant controls an airplane, and the objective comprises destroying a plurality of participants on an enemy team.

15. The computer readable storage media of claim 10, wherein each participant controls an airplane, and the objective comprises destroying a plurality of ground targets associated with an enemy team.

16. The computer readable storage media of claim 10, wherein each incremented level of artificial intelligence simulates human participants having increasing levels of experience completing the objective.

17. The computer readable storage media of claim 10, wherein the incrementing step is performed at least twice before the predefined threshold level of artificial intelligence is reached.

18. The computer readable storage media of claim 10, wherein permitting the user to launch the interactive session comprises:
   prior to completion of the objective with the one or more automated participants having the predefined threshold level of artificial intelligence, setting a flag usable to prevent the first human user from launching the interactive session; and
   upon completion of the objective with the one or more automated participants having the predefined threshold level of artificial intelligence, setting the flag to allow the first human user to launch the interactive session.

19. A method comprising:
   initiating a game client configured to provide a simulated three-dimensional virtual environment;
   responsive to a user providing first user input, initiating a tutorial session having a first objective;
   responsive to a user providing second user input, initiating a first training session having a second objective, wherein in each training session the user competes only against a plurality of bot participants in the simulated three-dimensional virtual environment and wherein in each training session the user is prevented from interacting with any other human participants; and
   responsive to a user providing third user input, initiating a dynamic session having the second objective, wherein when a first predetermined condition is met, the dynamic session is a second training session comprising stimuli presented to the user, said stimuli representative of a dynamic session, and said stimuli selected from a group comprising a chat message containing a typographical error, and a username of a human participant not participating in the training session, and wherein when a second predetermined condition is met, the dynamic session includes a plurality of other human participants.

* * * * *